US009341245B2

(12) United States Patent  (10) Patent No.: US 9,341,245 B2
Petersen et al.  (45) Date of Patent: May 17, 2016

(54) FRICTION ROLLER PLANETARY GEARING AND SPEED-CHANGING AND DIFFERENTIAL GEARING

(71) Applicant: VOLKSWAGEN AKTIENGESELLSCHAFT, Wolfsburg (DE)

(72) Inventors: Rainer Petersen, Wolfsburg (DE); Jörg Möckel, Sassenburg (DE); Andreas Lutz, Braunschweig (DE); Stefan Hanke, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 14/535,243

(22) Filed: Nov. 6, 2014

(65) Prior Publication Data

US 2015/0065287 A1  Mar. 5, 2015

Related U.S. Application Data (63) Continuation of application No. PCT/EP2013/060228, filed on May 17, 2013.

(30) Foreign Application Priority Data

May 24, 2012  (DE) .......................... 10 2012 010 316

(51) Int. Cl.
*F16H 13/08*  (2006.01)
*F16H 13/14*  (2006.01)
(Continued)

(52) U.S. Cl.
CPC *F16H 13/14* (2013.01); *B60K 1/00* (2013.01); *B60L 15/2054* (2013.01);
(Continued)

(58) Field of Classification Search
CPC ......... F16H 3/663; F16H 13/14; F16H 13/08; B60K 2001/001
USPC .................................. 475/183, 196, 339, 340
See application file for complete search history.

(56) References Cited

U.S. PATENT DOCUMENTS 3,216,285 A  11/1965 Nasvytis
3,475,993 A  11/1969 Hewko
(Continued)

FOREIGN PATENT DOCUMENTS

DE  251 276 A  1/1911
DE  10 2009 003 388 A1  8/2009
(Continued)

OTHER PUBLICATIONS

Search Report issued by the German Patent and Trademark Office for German Patent Application No. DE 10 2012 010 316.6, dated May 7, 2013.

(Continued)

Primary Examiner — Roger Pang
(74) Attorney, Agent, or Firm — Manfred Beck, P.A.

(57) ABSTRACT

A friction roller planetary gearing includes a first and a second sun which are axially displaceable with respect to one another and at least one of the suns is connected for conjoint rotation to a sun shaft. Stepped planets roll on the suns, on a first annulus and on a second annulus. The suns, the annuluses and the stepped planets are configured as friction rings. The second annulus is axially displaceable relative to the first annulus. A first torque-dependent axial displacement device controls a contact pressure between the suns and contact surfaces of the planets by using a torque-dependent axial displacement of at least one of the suns. A second torque-dependent axial displacement device controls a contact pressure between the annuluses and contact surfaces of the planets by using a torque-dependent axial displacement of at least one of the annuluses.

17 Claims, 4 Drawing Sheets

(51) Int. Cl.
*B60K 1/00* (2006.01)
*F16H 48/06* (2006.01)
*B60L 15/20* (2006.01)
*F16H 3/66* (2006.01)

(52) U.S. Cl.
CPC ............... *F16H 13/08* (2013.01); *F16H 48/06* (2013.01); *B60K 2001/001* (2013.01); *B60L 2240/421* (2013.01); *B60L 2240/423* (2013.01); *B60L 2240/486* (2013.01); *F16H 3/663* (2013.01)

(56) References Cited

U.S. PATENT DOCUMENTS

| | | | |
|---|---|---|---|
| 3,667,319 A | | 6/1972 | Scheiter |
| 4,126,060 A | * | 11/1978 | Rineer .................... F16H 13/06 475/183 |
| 4,128,016 A | | 12/1978 | Nasvytis |
| 4,617,838 A | * | 10/1986 | Anderson ............... F16H 13/08 475/195 |
| 5,385,514 A | * | 1/1995 | Dawe ...................... F16H 13/06 475/336 |
| 5,688,201 A | * | 11/1997 | Zhou ....................... F16H 13/06 475/183 |
| 6,004,239 A | * | 12/1999 | Makino ................... F16H 15/52 475/193 |
| 6,401,850 B1 | | 6/2002 | Bowen |
| 6,406,399 B1 | * | 6/2002 | Ai .......................... F16H 13/06 475/183 |
| 7,086,981 B2 | * | 8/2006 | Ali .......................... F02B 67/06 475/196 |
| 2009/0188732 A1 | | 7/2009 | Janson |
| 2013/0267368 A1 | | 10/2013 | Petersen et al. |
| 2015/0045169 A1 | * | 2/2015 | Liu ......................... F16H 13/14 475/195 |

FOREIGN PATENT DOCUMENTS

| | | |
|---|---|---|
| DE | 10 2010 054 533 A1 | 6/2012 |
| GB | 226 863 A | 12/1924 |
| GB | 249 182 A | 3/1926 |
| JP | 05157148 A * | 6/1993 |
| JP | 2003 278866 A | 10/2003 |
| JP | 2010 025237 A | 2/2010 |
| JP | 2010 276131 A | 12/2010 |
| JP | 2011 012722 A | 1/2011 |
| WO | 94/12811 A1 | 6/1994 |

OTHER PUBLICATIONS

International Search Report for International Application No. PCT/EP2013/060228 and translation thereof, dated Jun. 28, 2013.
International Preliminary Report on Patentability for International Application No. PCT/EP2013/060228 including Written Opinion of the International Searching Authority and translation thereof, dated Nov. 25, 2014.

* cited by examiner

FRICTION ROLLER PLANETARY GEARING AND SPEED-CHANGING AND DIFFERENTIAL GEARING

CROSS-REFERENCE TO RELATED APPLICATIONS

This application is a continuation, under 35 U.S.C. §120, of copending International Application No. PCT/EP2013/060228, filed May 17, 2013, which designated the United States; this application also claims the priority, under 35 U.S.C. §119, of German Patent Application No. DE 10 2012 010 316.6, filed May 24, 2012; the prior applications are herewith incorporated by reference in their entirety.

BACKGROUND OF THE INVENTION

1. Field of the Invention

The invention relates to a friction roller planetary gearing, including a housing, a sun shaft having a first and a second sun disposed thereon, which are each configured as friction rollers and are axially displaceable with respect to one another and of which at least one is connected for conjoint rotation to the sun shaft, a planet carrier, on which a plurality of stepped planets, which are configured as friction rollers and each have a pair of contact surfaces of smaller diameter and a pair of contact surfaces of larger diameter, are rotatably supported, and an annulus, which is connected to the housing in a manner fixed against rotation relative thereto and is configured as a friction ring, wherein the planets each roll on the suns through the use of the one pair of contact surfaces of the planets and roll on the annulus through the use of at least one contact surface of the other pair of contact surfaces of the planets, and wherein the contact pressure between the suns and the associated contact surfaces of the planets can be controlled by a torque-dependent axial displacement device through the use of a torque-dependent axial displacement of at least one of the suns.

The invention furthermore relates to a speed-changing and differential gearing, including an input stage, a load stage and a differential stage, which are each configured as planetary stages and are disposed coaxially with respect to one another, in particular to a speed-changing and differential gearing for an electrically driven motor vehicle having a housing, a gearing input shaft and two gearing output shafts, which are disposed coaxially with the gearing input shaft, wherein the speed-changing and differential gearing includes an input stage, which is configured as a planetary set and the sun shaft of which, which acts as an input stage input shaft, can be connected as the gearing input shaft coaxially with a drive output shaft of an electric machine and the planet carrier shaft of which acts as an input stage output shaft, a load stage, which is configured as a planetary set and the sun shaft of which is connected as a load stage input shaft coaxially with the input stage output shaft, the annulus of which is fixed in relation to the housing and the planet carrier shaft of which acts as a load stage output shaft, and a differential stage, which is configured as a double planetary set and has a differential input shaft and two differential output shafts, which can be connected as the gearing output shafts to driven wheels of the motor vehicle.

2. Prior Art

Generic friction roller gearings are known from U.S. Pat. No. 3,475,993. Generic speed-changing and differential gearings are found in U.S. Pat. No. 6,401,850. Gearing configurations of coaxial construction and, in particular, coaxial motor/gearing units have proven their worth for electrically driven motor vehicles on the basis of their advantages in terms of installation space, power transmission and efficiency.

There is further potential for improvement in the electric drive unit, i.e. the electric machine as such. It would be advantageous here to be able to use the electric machines employed for very efficient drives of high power to weight ratio in the construction of machine tools. Among the distinguishing features of these machines are very high rated rotational speeds, e.g. higher than 30,000 rpm. It is obvious that gearing structures with high transmission ratios, e.g. those with transmission ratios i=25-40, are required when such high- and very high-speed machines are used in electrically driven motor vehicles. The previously known gearing structures of coaxial construction have transmission ratio ranges which are much too narrow for this purpose. Simply adapting the numbers of teeth and/or the numbers of gearing stages is not a suitable solution to this problem. Owing to the very high rotational speeds, especially those which occur in the input stage of such a gearing configuration, the gearwheels involved would have to be manufactured with such precision that the associated costs would make this solution uneconomical. Moreover, the high rotational speeds would lead to considerable noise pollution, which would not meet modern comfort requirements for motor vehicles.

The use of known friction roller gearings instead of toothed gearings would not help at this point. In particular, a friction roller planetary gearing of the type in question for the occurring rotational speeds and the very large differences in torque between the input and output shaft that are caused by the high transmission ratio would not be suitable for the stated use. The known traction gearing (synonymous with friction roller gearing in the context of the present application) is configured as a planetary gearing with a double sun, symmetric stepped planets and a single annulus fixed in relation to the housing. The sun shaft serves as the gearing input shaft; the planet carrier shaft acts as the gearing output shaft. The suns disposed on the sun shaft are configured as frustoconical friction rollers, the smaller ends of which face one another. A first sun is supported on the sun shaft through the use of a toothing, preventing relative rotation but allowing axial movement. The second sun is supported loosely on the sun shaft. Both suns are in contact through the use of the contact surfaces thereof (these being in the form of frustocone circumferential surfaces) with pairs of correspondingly shaped contact surfaces of the planets, which are configured as friction rollers. Each planet has a circumferential groove beveled on both sides, which separates the individual surfaces of the contact surface pair thereof from one another. The side walls of this groove are in contact with correspondingly shaped flanks of the annulus, which is configured as a friction ring and is fixed in relation to the housing. As is known, a torque is transmitted in such gearings from the input to the output shaft by way of the traction between the various friction elements. The geometrical transmission ratios are calculated in a manner similar to that for toothed gearings by way of the diameters of the participating contact surfaces, wherein in each case the perpendicular distance between the axis of rotation and the actual point of contact on the surface of the friction body is to be taken as the diameter. Thus, in the known traction gearing, the diameter of the planet contact surfaces with the suns is greater than the diameter of the planet contact surfaces with the annulus, with the result that the planets act as stepped planets.

The efficiency of torque transmission through the use of traction depends decisively on the contact pressure of the interacting contact surfaces, while the optimum thereof is very much dependent on the contact surface geometry and on the rotational speeds and torques involved.

The known device therefore has a torque adaptation device configured as a ball-ramp axial displacement device. Thus, a supporting body which guides a set of balls in ball ramps is connected rigidly to the sun shaft on the rear side of the free sun, wherein the balls serve as spacers between the supporting body and the free sun. Depending on the torque to be transmitted, there is a relative rotation of the free sun and the supporting body, this being converted through the use of the ball ramp guide into an axial displacement of the free sun. This results in an increase in the contact pressure between the suns and the planets, but this is also associated with a radial displacement of the planets which, for its part, leads to a change in the contact pressure between the planets and the annulus. The radial displacement of the planets is made possible, in particular, by the fact that the bearing journals on which the planets are supported are supported in radial slots in the planet carrier.

This embodiment of a traction stage has various disadvantages. On the one hand, the radially displaceable support of the planet bearing journals is technically complex and therefore expensive. Secondly, as described, a torque-dependent change in the contact pressure between the suns and the planets also has a direct effect on the contact between the planets and the annulus. This is disadvantageous, especially in the case of high transmission ratios, where the rotational speed and torque ratios in the various contact areas differ widely, because an optimum setting in both contact areas is impossible as a result. Finally, it must be regarded as a disadvantage, especially in the case of high-speed applications, that centrifugal forces acting on the planets also act directly on the contact between the planets and the annulus (imposing a load) and between the planets and suns (with a load-relieving effect), owing to the radially displaceable support of the planet bearing journals.

SUMMARY OF THE INVENTION

It is accordingly an object of the invention to provide a friction roller planetary gearing as well as a speed-changing and differential gearing which overcome the above-mentioned disadvantages of the heretofore-known gearings of this general type. It is in particular an object of the invention to provide an input stage which is suitable for coaxial gearings with a high transmission ratio operating in the high-speed range.

With the foregoing and other objects in view there is provided, in accordance with the invention, a friction roller planetary gearing, including:
 a housing;
 a sun shaft having a first and a second sun disposed thereon, the first and the second sun being configured as respective friction rollers and being axially displaceable with respect to one another, at least one of the suns being connected for conjoint rotation to the sun shaft;
 a planet carrier;
 a first annulus connected to the housing in a manner fixed against rotation relative thereto, the first annulus being configured as a friction ring;
 a plurality of stepped planets rotatably supported on the planet carrier, the stepped planets being configured as friction rollers and each having a pair of contact surfaces of a relatively smaller diameter and a pair of contact surfaces of a relatively larger diameter, the planets each rolling on the suns by using an associated one of the pairs of contact surfaces and rolling on the first annulus by using at least one of the contact surfaces of a respective other one of the pairs of the contact surfaces;
 a second annulus configured as a friction ring, the second annulus being disposed to be axially displaceable relative to the first annulus such that the planets roll on the first and on the second annulus by using a respective associated one of the pairs of contact surfaces of the planets;
 a first torque-dependent axial displacement device controlling a contact pressure between the suns and associated ones of the contact surfaces of the planets by using a torque-dependent axial displacement of at least one of the suns; and
 a second torque-dependent axial displacement device controlling a contact pressure between the annuluses and associated ones of the contact surfaces of the planets by using a torque-dependent axial displacement of at least one of the annuluses.

In other words according to the invention, there is provided a friction roller planetary gearing, including:
 a housing;
 a sun shaft having a first and a second sun disposed thereon, which are each configured as friction rollers and are axially displaceable with respect to one another and of which at least one is connected for conjoint rotation to the sun shaft;
 a planet carrier, on which a plurality of stepped planets, which are configured as friction rollers and each have a pair of contact surfaces of smaller diameter and a pair of contact surfaces of larger diameter, are rotatably supported; and
 a first annulus, which is connected to the housing in a manner fixed against rotation relative thereto and is configured as a friction ring, wherein the planets each roll on the suns through the use of the one pair of contact surfaces of the planets and roll on the first annulus through the use of at least one contact surface of the other pair of contact surfaces of the planets, and wherein the contact pressure between the suns and the associated contact surfaces of the planets can be controlled by a first torque-dependent axial displacement device through the use of torque-dependent axial displacement of at least one of the suns, wherein a second annulus configured as a friction ring is provided, which is disposed so as to be axially displaceable relative to the first annulus, with the result that the planets roll on both annuluses through the use of the associated pair of contact surfaces of the planets, wherein the contact pressure between the annuluses and the associated contact surfaces of the planets is controllable by a second torque-dependent axial displacement device through the use of torque-dependent axial displacement of at least one of the annuluses.

The object of the invention is achieved in particular by virtue of the fact that a second annulus configured as a friction ring is provided, which is disposed so as to be axially displaceable relative to the first annulus, with the result that the planets roll on both annuluses through the use of the associated pair of contact surfaces of the planets, wherein the contact pressure between the annuluses and the associated contact surfaces of the planets is controllable by a second torque-dependent axial displacement device through the use of torque-dependent axial displacement of at least one of the annuluses.

The basic concept of the invention is to provide not only the sun-planet contact but also the plane-annulus contact with a torque-dependent contact pressure control. This makes it possible, as envisaged in a preferred embodiment, to connect the bearing journals on which the planets are supported on the planet carrier to the planet carrier in a radially fixed manner. Radially acting force components of the contact forces, on the one hand, and of the centrifugal forces, on the other hand, can thus be supported by the bearing journals, with the result that an independent control of the contact pressure matched to the local rotational speed and torque conditions can be achieved. The specific configuration of this matching is left to a person skilled in the art, having regard to the individual case, for which purpose the person of skill in the art can, in particular, employ geometrical configuration of the respective axial displacement device. In other words, the invention makes it possible to optimize the traction conditions between the suns and the planets, on the one hand, and between the planets and the annuluses, on the other hand, independently of one another, thus optimizing the efficiency of the traction gearing according to the invention overall.

According to another feature of the invention, the planets are configured symmetrically, the contact surfaces of the relatively smaller diameter are associated with the annuluses and the contact surfaces of the relatively larger diameter are associated with the suns; and the contact surfaces associated with the suns are disposed axially between the contact surfaces associated with the annuluses. It is accordingly advantageous to make provision for the contact surfaces of the symmetrically configured planets which are associated with the annuluses to have a smaller diameter than the contact surfaces of the planets which are associated with the suns, and for the contact surfaces associated with the suns to be disposed axially between the contact surfaces associated with the annuluses. This describes a particularly advantageous shape of the planet rollers. They can be described as rotationally symmetrical bodies which have a greater width in the region close to the axis than in the region remote from the axis, with the region close to the axis and that remote from the axis preferably being connected to one another by a connection with a web-like cross section. This shape reduces the overall weight and, in particular, the moment of inertia as compared with shapes in accordance with the prior art that forms the type in question. At the same time, the resulting stepping of a stepped planet of this kind can be more pronounced, making it possible to achieve higher transmission ratios.

According to another feature of the invention, the first annulus is connected rigidly to the housing and the second annulus is connected to the housing in a manner fixed against rotation relative thereto. As a person skilled in the art will recognize, many axially displaceable parts are involved in a traction gearing according to the invention. Nevertheless, there is a need at least one point for a fixed reference through the use of which the gearing according to the invention can be put into spatial and power-transmitting relationship with other elements, e.g. other gearing stages and/or a drive. It has proven particularly advantageous if the first annulus is connected rigidly to the housing and the second annulus is connected to the housing in a manner fixed against rotation relative thereto. In other words, the first annulus forms the abovementioned fixed reference. The advantageous embodiments described below can be employed in a particularly advantageous manner in combination with such spatial referencing. However, other embodiments are also conceivable, in which a sun or the sun shaft serves as a fixed reference, for example. It will be easy for a person skilled in the art to adapt the relevant details of the embodiments described below as appropriate in light of the teaching disclosed here.

According to another feature of the invention, the first torque-dependent axial displacement device, which is associated with the suns, has a ramp carrier and a set of spacers; the ramp carrier is fixed for conjoint rotation to the sun shaft and is supported axially on the sun shaft on a side of the second sun facing away from the first sun; and the set of spacers is provided between the ramp carrier and the second sun, the spacers are in contact with the ramp carrier and with the second sun, the ramp carrier and/or the second sun has ramp guides and the spacers are guided in the ramp guides. Thus, provision is preferably made for the axial displacement device associated with the suns to have a ramp carrier, which is fixed for conjoint rotation to the sun shaft and is supported axially on the sun shaft on the side of the second sun facing away from the first sun, and, between the ramp carrier and the second sun, to have a set of spacers, which make contact with these two components, wherein the spacers are guided in ramp guides of the ramp carrier and/or of the second sun. The second sun is in this case supported loosely, i.e. capable of spinning, on the sun shaft. Depending on the torque applied, there is thus a relative rotation between the second sun and the ramp carrier, which is converted through the use of the spacers and the ramp guides into a torque-dependent axial displacement of the second sun. The specific form of this dependency relationship depends on the specific shape of the ramp guides. Thus, for example, linear but also significantly more complicated torque dependency relationships can be achieved.

According to another feature of the invention, the ramp carrier has a supporting ring and a ramp carrier sleeve; and the supporting ring is connected in an axially fixed manner to the sun shaft, the ramp carrier sleeve is provided on a sun side of the supporting ring and is supported against the supporting ring, and the ramp carrier sleeve is connected for conjoint rotation to the sun shaft. An element connected rigidly to the sun shaft could be used as a ramp carrier, for example. However, this is unfavorable in respect of manufacture and assembly. In a preferred embodiment, provision is therefore made for the ramp carrier to have a supporting ring connected in an axially fixed manner to the sun shaft and, on the sun side of the ring, to have a ramp carrier sleeve supported against the ring and connected for conjoint rotation to the sun shaft. This allows a simple assembly by pushing the elements onto the sun shaft. The supporting ring can be configured as a simple snap ring in a groove of the sun shaft, for example.

According to another feature of the invention, the second torque-dependent axial displacement device, which is associated with the annuluses, has a ramp carrier and a set of spacers; the ramp carrier is provided on a side of the second annulus facing away from the first annulus and is connected rigidly to the housing; and the set of spacers is provided between the ramp carrier and the second annulus, the spacers are in contact with the ramp carrier and with the second annulus, the ramp carrier and/or the second annulus has ramp guides and the spacers are guided in the ramp guides. Thus, similarly to the embodiment of the axial displacement device of the suns, provision is made in a preferred embodiment of the invention for the axial displacement device associated with the annuluses to have a ramp carrier, which is connected rigidly to the housing on the side of the second annulus which faces away from the first annulus, and, between the ramp carrier and the second annulus, to have a set of spacers, which make contact with these two components and are guided in ramp guides of the ramp carrier and/or of the second annulus. For the operation of this axial displacement device, reference may be made where applicable to what has been stated above in relation to the axial displacement device of the suns. However, this embodiment is slightly simpler since a fixed reference is already provided by the first annulus. The short-circuiting of the forces which occurs from the first sun, via the sun shaft, to the ramp carrier in the sun-side axial displacement device, takes place from the first annulus, via the housing, to the ramp carrier in the annulus-side axial displacement device. In the modifications of the invention which have already been mentioned above, in which it is not the first annulus but, for example, the sun shaft which serves as a spatial reference, a person skilled in the art will have to make corresponding adaptations.

According to another feature of the invention, the ramp guides are configured as undulating face cams. Thus, provision is preferably made for the ramp guides of at least one axial displacement device to be configured as undulating face cams. In this embodiment, the ramp carrier, in particular the ramp carrier sleeve, has undulating cams on the face thereof facing the respective element to be disengaged, the cams serving as an abutment for the spacers. As an alternative or in addition, the respective elements to be disengaged, i.e. the second sun and/or the second annulus, can have such undulating face cams on the face thereof facing the respectively associated ramp carrier. A person skilled in the art will recognize that the mode of operation corresponds to that of known ball ramp guides and that such ball ramp guides are in fact a possible form of embodiment. However, it is preferred that the spacers of at least one axial displacement device be configured as radially oriented cylindrical bodies. This embodiment has two advantages. On the one hand, the configuration of the face cams, which do not necessarily have to have guide grooves for the spacers, is significantly simpler than in the case of ball ramp guides, which necessarily require grooves with a semicircular groove base. On the other hand, the cylindrical embodiment of the spacers (and the corresponding face cam configuration) also prevents the axial displacement device from absorbing radial forces, which is always the case with a typical ball ramp guide via the side walls of the guide grooves. Thus, according to another feature of the invention, the spacers of the first torque-dependent axial displacement device are configured as radially oriented cylindrical bodies and/or the spacers of the second torque dependent axial displacement device are configured as radially oriented cylindrical bodies.

According to another feature of the invention, the ramp guides are axially spring-loaded, i.e. prestressed, in a direction towards the spacers. In order to have available a base traction, irrespective of the torque, provision is thus preferably made for the ramp guides to be axially spring-loaded in the direction of the spacers. For example, the face cams of the ramp carriers can be configured as diaphragm springs (plate springs) or be backed by diaphragm springs.

As a person skilled in the art will recognize, the capacity for axial displacement of the planets is indispensable in the context of the present invention. It is immaterial here if this capacity for displacement results from a capacity for displacement of the planets on the bearing journals thereof or from axial displaceability of the bearing journals themselves. Together with the independence of the two contact pressure control systems from one another, this means that pressure adaptation of the contact pressure between annuluses and planets leads to an axial displacement of the planets which does not have any equivalent in the contact pressure control system between the suns and planets. To provide compensation here, provision is preferably made for the sun shaft and, with it, the first sun to be supported so as to be axially displaceable. Thus, according to a feature of the invention, the sun shaft is supported so as to be axially displaceable. As an alternative, axial displaceability of the first sun on the sun shaft could be provided, but this is more complex in terms of construction. Here too, a person skilled in the art will recognize that appropriate adaptations have to be made if the spatial reference is implemented other than by the first annulus being fixed in relation to the housing.

In an embodiment of the invention, it is provided that bearing journals, on which the planets are supported on the planet carrier so as to be axially displaceable, are connected in a radially fixed manner to the planet carrier. Thus, according to a feature of the invention, bearing journals are provided, which are connected in a radially fixed manner to the planet carrier, the planets are supported, at the planet carrier, on the bearing journals so as to be axially displaceable.

With the objects of the invention in view there is also provided, a speed-changing and differential gearing, including an input stage, a load stage, and a differential stage, which are each configured as planetary stages and are disposed coaxially with respect to one another; the input stage is configured as a friction roller planetary gearing which includes:

a housing;

a sun shaft having a first and a second sun disposed thereon, the first and the second sun being configured as respective friction rollers and being axially displaceable with respect to one another, the first and/or the second sun being connected for conjoint rotation to the sun shaft;

a planet carrier;

a first annulus connected to the housing in a manner fixed against rotation relative thereto, the first annulus being configured as a friction ring;

a plurality of stepped planets rotatably supported on the planet carrier, the stepped planets being configured as friction rollers and each having a pair of contact surfaces of a relatively smaller diameter and a pair of contact surfaces of a relatively larger diameter, the planets each rolling on the suns by using an associated one of the pairs of contact surfaces and rolling on the first annulus by using at least one of the contact surfaces of a respective other one of the pairs of the contact surfaces;

a second annulus configured as a friction ring, the second annulus being disposed to be axially displaceable relative to the first annulus such that the planets roll on the first and on the second annulus by using a respective associated one of the pairs of contact surfaces of the planets;

a first torque-dependent axial displacement device controlling a contact pressure between the suns and associated ones of the contact surfaces of the planets by using a torque-dependent axial displacement of at least one of the suns; and a second torque-dependent axial displacement device controlling a contact pressure between the annuluses and associated ones of the contact surfaces of the planets by using a torque-dependent axial displacement of at least one of the annuluses.

The preferred area of application of the traction gearing according to the invention is as an input stage of a speed-changing and differential gearing, including an input stage, a load stage and a differential stage, which are each configured as planetary stages and are disposed coaxially with respect to one another. A speed-changing and differential gearing of this kind can be configured in a particularly compact way if provision is made for the planet carrier shafts of the load stage and of the differential stage to serve as the output shaft and the input shaft thereof respectively, wherein planets of the load stage and planets of the differential stage are supported jointly on continuous bearing journals common to these two gearing stages. In other words, according to another feature of the invention, the load stage has a planet carrier shaft serving as an output shaft for the load stage, the differential stage has a planet carrier shaft serving as an input shaft for the differential stage; and the load stage and the differential stage have planets and continuous bearing journals common to the load stage and to the differential stage, the planets of the load stage and the planets of the differential stage are supported jointly on the continuous bearing journals.

With the objects of the invention in view there is also provided, in combination with an electrically driven motor vehicle having driven wheels and an electric machine with an output shaft, a speed-changing and differential gearing including:

a housing;

a gearing input shaft;

two gearing output shafts disposed coaxially with the gearing input shaft;

an input stage configured as a friction roller planetary gearing, the input stage having a sun shaft acting as an input stage input shaft and being coaxially connectable, as the gearing input shaft, to the output shaft of the electric machine, the input stage having a planet carrier and a planet carrier shaft acting as an input stage output shaft, the sun shaft of the input stage having a first and a second sun disposed thereon, the first and the second sun being configured as respective friction rollers and being axially displaceable with respect to one another, at least one of the first and the second sun being connected for conjoint rotation to the sun shaft;

the input stage having a first annulus connected to the housing in a manner fixed against rotation relative thereto, the first annulus being configured as a friction ring;

the input stage having a plurality of stepped planets rotatably supported on the planet carrier, the stepped planets being configured as friction rollers, the stepped planets defining a first planet step of a relatively larger diameter and a second planet step of a relatively smaller diameter such that one of the suns rolls on the first planet step and the first annulus fixed in relation to the housing rolls on the second planet step, the stepped planets each having a pair of contact surfaces of a relatively smaller diameter and a pair of contact surfaces of a relatively larger diameter, the stepped planets each rolling on the suns by using an associated one of the pairs of contact surfaces and rolling on the first annulus by using at least one of the contact surfaces of a respective other one of the pairs of the contact surfaces;

the input stage having a second annulus configured as a friction ring, the second annulus being disposed to be axially displaceable relative to the first annulus such that the planets roll on the first and on the second annulus by using a respective associated one of the pairs of contact surfaces of the planets;

the input stage having a first torque-dependent axial displacement device controlling a contact pressure between the suns and associated ones of the contact surfaces of the planets by using a torque-dependent axial displacement of at least one of the suns;

the input stage having a second torque-dependent axial displacement device controlling a contact pressure between the annuluses and associated ones of the contact surfaces of the planets by using a torque-dependent axial displacement of at least one of the annuluses;

a load stage configured as a planetary set, the load stage having a sun shaft coaxially connected, as a bad stage input shaft, to the input stage output shaft, the bad stage having an annulus fixed in relation to the housing, the bad stage having a planet carrier shaft acting as a bad stage output shaft; and a differential stage configured as a double planetary set, the differential stage having a differential stage input shaft and two differential stage output shafts, the differential stage output shafts being connectable, as the gearing output shafts, to the driven wheels of the motor vehicle, the differential stage having a planet carrier shaft acting as the differential stage input shaft, the differential stage having sun shafts acting as the differential stage output shafts.

In other words, according to the invention, there is also provided a speed-changing and differential gearing for an electrically driven motor vehicle having a housing, a gearing input shaft and two gearing output shafts, which are disposed coaxially with the gearing input shaft, including:

an input stage, which is configured as a planetary set and the sun shaft of which, which acts as an input stage input shaft, can be connected as the gearing input shaft coaxially with a drive output shaft of an electric machine and the planet carrier shaft of which acts as an input stage output shaft;

a load stage, which is configured as a planetary set and the sun shaft of which is connected as a load stage input shaft coaxially with the input stage output shaft, the annulus of which is fixed in relation to the housing and the planet carrier shaft of which acts as a load stage output shaft;

a differential stage, which is configured as a double planetary set and has a differential input shaft and two differential output shafts, which can be connected as the gearing output shafts to driven wheels of the motor vehicle, wherein the planets of the input stage, which is configured as a friction roller planetary gearing as defined above, are configured as stepped planets, wherein a sun rolls on a first planet step of larger diameter and an annulus fixed in relation to the housing rolls on a second planet step of smaller diameter, and wherein the planet carrier shaft of the differential stage acts as a differential stage input shaft and the sun shafts of the differential stage act as differential stage output shafts.

It is thus possible to further develop speed-changing and differential gearings of the type defined above in such a way that the planets of the input stage configured as a friction roller planetary gearing of this kind are configured as stepped planets, wherein a sun rolls on a first planet step of larger diameter and an annulus fixed in relation to the housing rolls on a second planet step of smaller diameter, and in such a way that the planet carrier shaft of the differential stage acts as a differential stage input shaft and the sun shafts of the differential stage act as differential stage output shafts. Other features which are considered as characteristic for the invention are set forth in the appended claims.

Further features and advantages of the invention will emerge from the following specific description and the drawings.

Although the invention is illustrated and described herein as embodied in a friction roller planetary gearing and a speed-changing and differential gearing, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
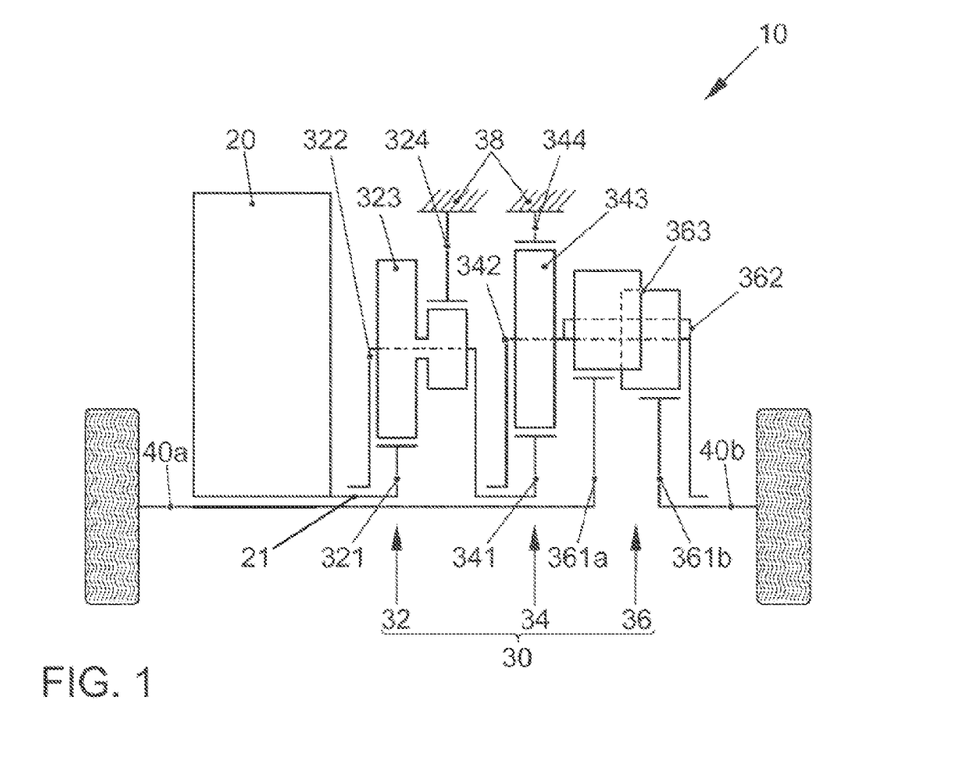
FIG. 1 is a schematic view of a drive train of a motor vehicle in accordance with the invention.

Referring now to the figures of the drawings in detail and first, particularly, to FIG. 1 thereof, there is shown, in a schematic illustration, the drive train 10 of an electrically driven motor vehicle, which is particularly suitable for the use of a traction gearing according to the invention. A torque produced through the use of an electric machine 20 is transmitted to the stubs 40a,b of a driven vehicle axle via a speed-changing and differential gearing 30. The electric machine 20, the speed-changing and differential gearing 30 and the axial stubs 40a,b are disposed coaxially with one another. The speed-changing and differential gearing 30 includes an input stage 32, a load stage 34 and a differential stage 36. The input shaft of the input stage is the sun shaft 321 thereof, which is connected to the output shaft 21 of the electric machine. The planet carrier 322 carries a set of stepped planets 323, the larger step of which is operatively connected to the sun shaft 321 and the smaller step of which is operatively connected to an annulus 324. The annulus 324 is connected in a manner fixed against relative rotation to a gearing housing 38. The output shaft of the input stage 32 is the shaft of the planet carrier 322. This is connected to the sun shaft 341 of the load stage 34. The planet carrier 342 thereof carries a set of simple planets 343, which interact with the sun shaft 341, on the one hand, and with an annulus 344 fixed in relation to the housing, on the other hand. The output shaft of the load stage is the shaft of the planet carrier 342. This is connected to the planet carrier 362 of the differential stage 36. The planet carrier 362 of the differential stage 36 carries a double planetary set 363, the individual planets of which interact with one another in pairs and respectively with one of two sun shafts 361a,b. The sun shafts 361a, 361b serve as output shafts of the differential stage 36 and simultaneously as the gearing output shaft of the speed-changing and differential gearing 30. In particular, sun shaft 361a is connected to axle stub 40a and sun shaft 361b is connected to axle stub 40b, It can be seen that the load stage 34 and the differential stage 36 are connected to one another by the shafts of the respective planet carriers 342, 362 thereof. In order to achieve a particularly compact construction, the planets 343 of the load stage 34 and respectively associated planets of the double planetary set 363 of the differential stage 36 can be supported on continuous common bearing journals.

The present invention relates primarily to the preferred embodiment of the input stage 32 as a traction or friction roller gearing, wherein a gearing of this kind can advantageously also be employed in isolation or in some combination other than that shown in FIG. 1.

Figure 2:
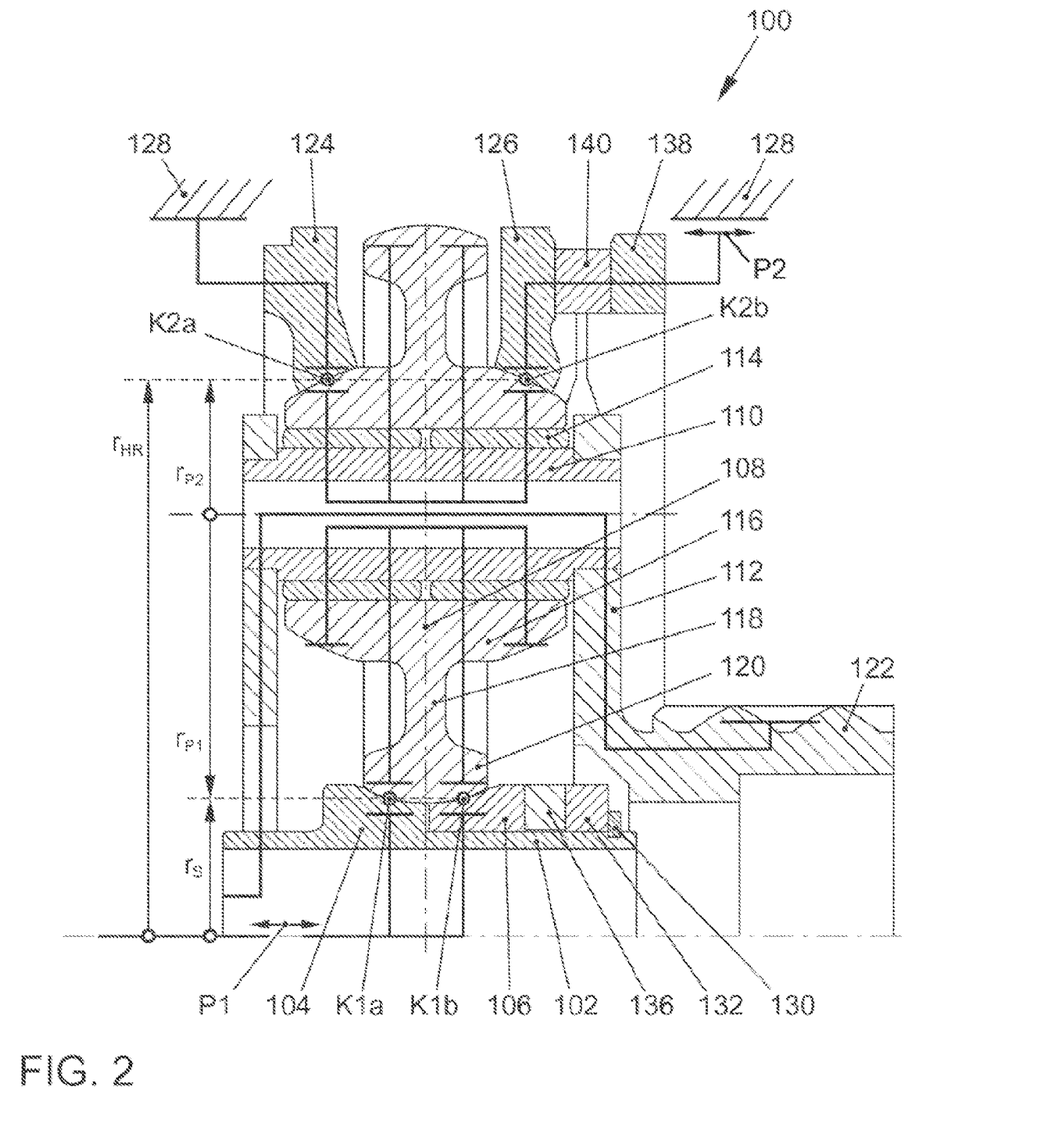
FIG. 2 is a sectional view of a traction gearing according to the invention.
Figure 3:
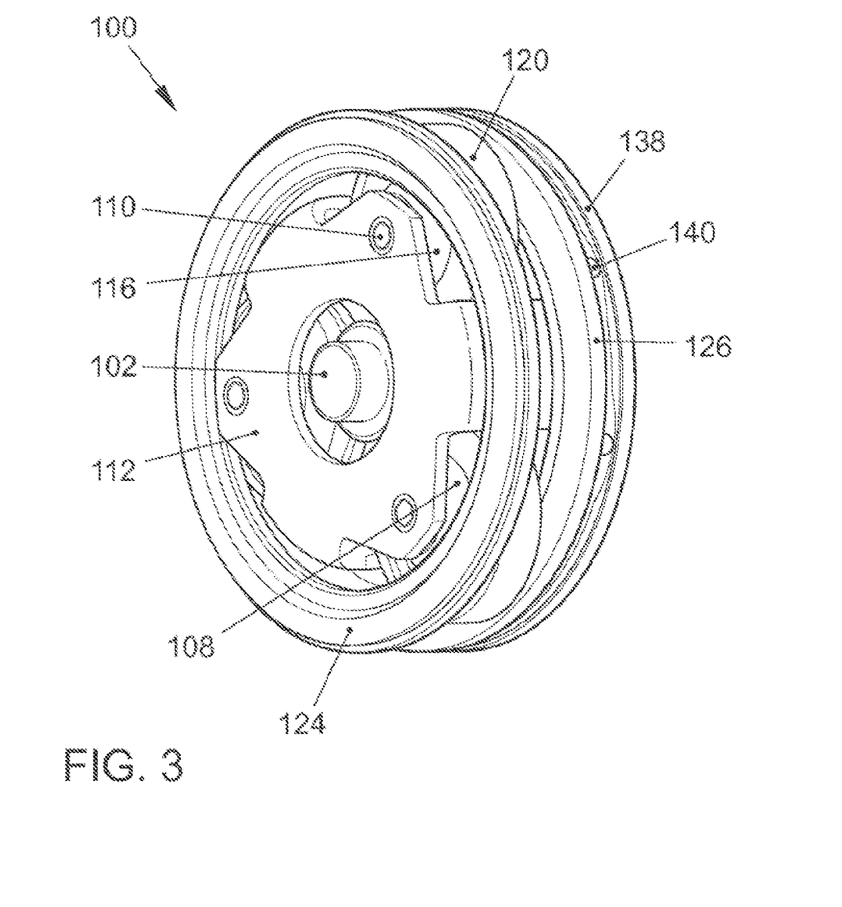
FIG. 3 is a perspective view of the traction gearing of FIG. 2 in accordance with the invention.
Figure 4:
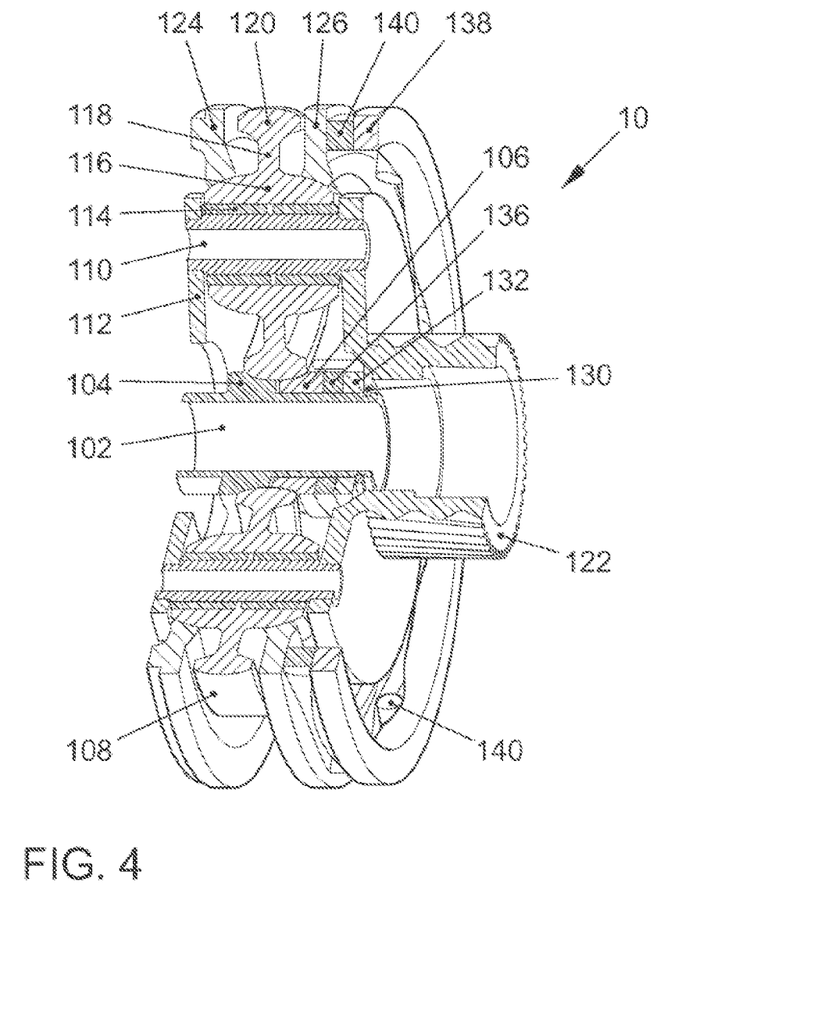
FIG. 4 is a sectional perspective view of the traction gearing of FIG. 2 in accordance with the invention.

FIGS. 2 to 4 show, in different illustrations, a particularly advantageous embodiment of a traction gearing of this kind, wherein reference signs independent of those in FIG. 1 are used, inter alia in order to emphasize the independence of the traction gearing 100 from the structure in FIG. 1. FIGS. 2 to 4, which have a unitary system of reference characters, will be discussed jointly below.

The traction gearing 100 is configured as a planetary set. The sun shaft 102 thereof, which, as indicated by the double arrow P1, can be displaced axially to a limited extent, carries a sun 104 connected rigidly thereto, in the present case, in particular, connected integrally thereto. This sun, which is referred to as the first sun in the claims, will be referred to as fixed sun 104 for greater clarity in the context of this specific description. A further sun 106 is supported loosely on the sun shaft 102 adjacent to the fixed sun 104. This sun, which is referred to as the second sun 106 in the claims, will be referred to as free sun 106 for greater clarity in the context of this specific description. The two suns 104, 106 bear contact surfaces which are concavely curved toward the inside, i.e. fall away toward one another. These contact surfaces are in contact with correspondingly convexly shaped contact surfaces of stepped planets 108, of which just one is shown in FIG. 2. The actual contact points between the sun- and planet-side contact surfaces are illustrated schematically in FIG. 2 and are designated as K1a and K1b. The perpendicular distances between the contact points K1a, K1b and the respective axis of rotation form the contact radii and are designated in FIG. 2 as $r_S$ and $r_{P1}$ respectively. These sun radii and first planet radii are jointly responsible with the annulus radii and second planet radii described below for the nominal transmission ratio of the traction gearing 100.

The planets 108 are supported on bearing journals on a planet carrier 112, which is connected to a planet carrier shaft 122 disposed coaxially with the sun shaft 102. In the embodiment illustrated, support is provided via needle bearings 114 which, in addition to rotation of the planets 108, also allow axial displacement thereof, with the bearing journals 110 being connected rigidly to the planet carrier 112. The planets 108 are of a rotationally symmetrical construction and have double mirror symmetry in cross section. They have a wide planet body 116, from which there extends a central, narrow planet neck 118, which, on a planet head 120 that widens again, bears the contact surfaces (already described above) for making contact with the suns 102, 104. The shoulders of the planet body 116 form a further pair of contact surfaces. These are convexly shaped and roll on correspondingly concavely shaped contact surfaces of two annuluses 124, 126. The annulus provided with the reference sign 124, which is referred to as first annulus 124 in the claims, is rigidly connected to the housing 128 in the embodiment illustrated and will be referred to as fixed annulus 124 for the sake of clarity in the context of this specific description. Annulus 126, which is referred to as second annulus 126 in the claims, will be referred to as free annulus 126 for the sake of clarity in the context of this specific description. As the double arrow P2 symbolizes, it is connected to the housing 128 in a manner which prevents relative rotation but allows axial displacement.

The actual contact points between the annuluses 124, 126 and the shoulders of the planets 108 are illustrated schematically in FIG. 2 and are designated as K2a and K2b. The distances thereof from the axis of rotation or axis of symmetry of the corresponding element form the contact radii, which are designated in FIG. 2 by $r_{HR}$ and $r_{P2}$.

In particular, $r_S$ denotes the sun radius, $r_{HR}$ denotes the annulus radius, $r_{P1}$ denotes a first planet radius and $r_{P2}$ denotes a second planet radius, with the two planet radii being different, thus giving functionally a stepped planet. In this case, the suns 104, 106 interact with the larger planet step and the annuluses 124, 126 interact with the smaller planet step. For control, in particular for torque-dependent control of the contact pressure acting at the contact points K1a, K1b and K2a, K2b between the respective contact surfaces, special axial displacement devices are provided. In the interior of the traction gearing 100, the free sun 106 can be displaced axially relative to the fixed sun 104. For this purpose, a snap ring 130 is disposed in a groove in the sun shaft 102, providing axial support for a ramp carrier sleeve 132. For its part, the ramp carrier sleeve 132 is connected for conjoint rotation to the sun shaft 102. Owing to the contact between the free sun 106 and the planet head 120, an axially outward-directed force acts on the free sun 106, which is supported against the ramp carrier sleeve 132 via radially aligned cylindrical spacers 134. The face of the ramp carrier sleeve facing the free sun 106 is of undulating configuration in the circumferential direction, thus giving a face cam structure. When free sun 106 is rotated relative to the ramp carrier sleeve 132, which occurs when the currently prevailing contact pressure does not match the currently applied torque, there is thus an axial displacement of the free sun 106 and hence a change in the contact pressure, in particular its adaptation to the torque applied. Owing to the axial displaceability of the planets 108, the contact pressure between the planet head 120 and the fixed sun 104 changes to the same extent. The traction-imparted torque transmission between the suns and planets thus remains symmetrical.

The outer axial displacement device, which controls the contact pressure between the annuluses 124, 126 and the shoulders of the planet body 116, operates in a similar way. Here, a ramp carrier 138 is connected rigidly to the housing 128. It is in contact with the outer face of the free annulus 126 via radially aligned cylindrical spacers 140. The face of the ramp carrier 138 which faces the free annulus 126 is of undulating configuration in the circumferential direction, thus producing face cams in this case too. When the free annulus 126 is rotated relative to ramp carrier 138, which occurs when the contact pressure between the annuluses 124, 126 and the shoulders of the planet body 116 does not match, there is thus an axial displacement of the free annulus 126. As a result, there is a change in the contact pressure. Owing to the axial displaceability of the planets 108, the traction-imparted torque transmission between annuluses 124, 126 and the shoulders of the planet body 116 remains symmetrical.

A person skilled in the art will recognize that the contact pressure adjustments by the two axial displacement devices are completely independent of one another. Nevertheless, there is a certain interaction due to the axial displacement of the planets. This can be compensated by the axial displaceability of the sun shaft 102. Changes in radial force components, in contrast, are supported by the bearing journals 110, which are disposed in a radially fixed manner in the planet carrier. These journals also support radial force components due to centrifugal force.

Of course, the embodiments discussed in the specific description and shown in the figures represent only illustrative embodiment examples of the present invention. There is a wide range of possible variations available to a person skilled in the art in light of the disclosure given here. In particular, a person skilled in the art will have to adapt the specific shape of the ramps or face cams to the specific requirements of the individual case. The torques and rotational speeds to be expected during the operation of the traction gearing 100 will have to be taken into account here. In particular, one of the typical construction goals will be to keep down the radial forces acting on the bearing journals 110. This allows a lighter embodiment of the needle bearings 114 and increases the efficiency of the gearing 100. However, the primary design aim will be to adjust the contact pressure at the contact points K1a, K1b and K2a, K2b exactly in such a way that the applied torque can just be transmitted without significant excess contact pressure.

LIST OF REFERENCE CHARACTERS 10 drive train
20 electric machine
21 output shaft of 20
30 speed-changing and differential gearing
32 input stage of 30
321 sun shaft of 32
322 planet carrier of 32
323 planet of 32
324 annulus of 32
34 load stage
341 sun shaft of 34
342 planet carrier of 34
343 planet of 34
344 annulus of 34
36 differential stage
361a,b sun shafts of 36
362 planet carrier of 36
363 double planetary set of 36
38 housing
40a,b axle stubs
100 traction gearing/friction roller gearing
102 sun shaft
104 fixed sun/first sun
106 free sun/second sun
108 planet
110 bearing journal
112 planet carrier
114 needle bearing
116 planet body
118 planet neck
120 planet head
122 planet carrier shaft
124 fixed annulus/first annulus
126 free annulus/second annulus
128 housing
130 snap ring
132 ramp carder sleeve
136 spacers
138 ramp carrier
140 spacers
K1a,b contact points, suns/planet
K2a,b contact points, annuluses/planet
P1, P2 double arrows
$r_S$ sun radius
$r_{HR}$ annulus radius
$r_{P1}$ first planet radius
$r_{P2}$ second planet radius

What is claimed is:

1. A friction roller planetary gearing, comprising:
a housing;
a sun shaft having a first and a second sun disposed thereon, said first and said second sun being configured as respective friction rollers and being axially displaceable with respect to one another, at least one of said first and said second sun being connected for conjoint rotation to said sun shaft;
a planet carrier;
a first annulus connected to said housing in a manner fixed against rotation relative thereto, said first annulus being configured as a friction ring;
a plurality of stepped planets rotatably supported on said planet carrier, said stepped planets being configured as friction rollers and each having a pair of contact surfaces of a relatively smaller diameter and a pair of contact surfaces of a relatively larger diameter, said planets each rolling on said suns by using an associated one of said pairs of contact surfaces and rolling on said first annulus by using at least one of said contact surfaces of a respective other one of said pairs of said contact surfaces;
a second annulus configured as a friction ring, said second annulus being disposed to be axially displaceable relative to said first annulus such that said planets roll on said first and on said second annulus by using a respective associated one of said pairs of contact surfaces of said planets;

a first torque-dependent axial displacement device controlling a contact pressure between said suns and associated ones of said contact surfaces of said planets by using a torque-dependent axial displacement of at least one of said suns; and a second torque-dependent axial displacement device controlling a contact pressure between said annuluses and associated ones of said contact surfaces of said planets by using a torque-dependent axial displacement of at least one of said annuluses.

2. The friction roller planetary gearing according to claim 1, wherein:

said planets are configured symmetrically, said contact surfaces of the relatively smaller diameter are associated with said annuluses and said contact surfaces of the relatively larger diameter are associated with said suns; and said contact surfaces associated with said suns are disposed axially between said contact surfaces associated with said annuluses.

3. The friction roller planetary gearing according to claim 1, wherein said first annulus is connected rigidly to said housing and said second annulus is connected to said housing in a manner fixed against rotation relative thereto.

4. The friction roller planetary gearing according to claim 1, wherein:

said first torque-dependent axial displacement device, which is associated with said suns, has a ramp carrier and a set of spacers;

said ramp carrier is fixed for conjoint rotation to said sun shaft and is supported axially on said sun shaft on a side of said second sun facing away from said first sun; and said set of spacers is provided between said ramp carrier and said second sun, said spacers are in contact with said ramp carrier and with said second sun, at least one of said ramp carrier and said second sun has ramp guides and said spacers are guided in said ramp guides.

5. The friction roller planetary gearing according to claim 4, wherein:

said ramp carrier has a supporting ring and a ramp carrier sleeve; and said supporting ring is connected in an axially fixed manner to said sun shaft, said ramp carrier sleeve is provided on a sun side of said supporting ring and is supported against said supporting ring, and said ramp carrier sleeve is connected for conjoint rotation to said sun shaft.

6. The friction roller planetary gearing according to claim 1, wherein said second torque-dependent axial displacement device, which is associated with said annuluses, has a ramp carrier and a set of spacers;

said ramp carrier is provided on a side of said second annulus facing away from said first annulus and is connected rigidly to said housing; and said set of spacers is provided between said ramp carrier and said second annulus, said spacers are in contact with said ramp carrier and with said second annulus, at least one of said ramp carrier and said second annulus has ramp guides and said spacers are guided in said ramp guides.

7. The friction roller planetary gearing according to claim 4, wherein said ramp guides are configured as undulating face cams.

8. The friction roller planetary gearing according to claim 6, wherein said ramp guides are configured as undulating face cams.

9. The friction roller planetary gearing according to claim 4, wherein said spacers of said first torque-dependent axial displacement device are configured as radially oriented cylindrical bodies.

10. The friction roller planetary gearing according to claim 6, wherein said spacers of said second torque-dependent axial displacement device are configured as radially oriented cylindrical bodies.

11. The friction roper planetary gearing according to claim 4, wherein said ramp guides are axially spring-loaded in a direction towards said spacers.

12. The friction roller planetary gearing according to claim 6, wherein said ramp guides are axially spring-loaded in a direction towards said spacers.

13. The friction roller planetary gearing according to claim 1, wherein said sun shaft is supported so as to be axially displaceable.

14. The friction roller planetary gearing according to claim 1, including bearing journals connected in a radially fixed manner to said planet carrier, said planets being supported, at said planet carrier, on said bearing journals so as to be axially displaceable.

15. A speed-changing and differential gearing, comprising:

an input stage, a load stage, and a differential stage, which are each configured as planetary stages and are disposed coaxially with respect to one another;

said input stage being configured as a friction roller planetary gearing including:

a housing;

a sun shaft having a first and a second sun disposed thereon, said first and said second sun being configured as respective friction rollers and being axially displaceable with respect to one another, at least one of said first and said second sun being connected for conjoint rotation to said sun shaft;

a planet carrier;

a first annulus connected to said housing in a manner fixed against rotation relative thereto, said first annulus being configured as a friction ring;

a plurality of stepped planets rotatably supported on said planet carrier, said stepped planets being configured as friction ropers and each having a pair of contact surfaces of a relatively smaller diameter and a pair of contact surfaces of a relatively larger diameter, said planets each rolling on said suns by using an associated one of said pairs of contact surfaces and rolling on said first annulus by using at least one of said contact surfaces of a respective other one of said pairs of said contact surfaces;

a second annulus configured as a friction ring, said second annulus being disposed to be axially displaceable relative to said first annulus such that said planets roll on said first and on said second annulus by using a respective associated one of said pairs of contact surfaces of said planets;

a first torque-dependent axial displacement device controlling a contact pressure between said suns and associated ones of said contact surfaces of said planets by using a torque-dependent axial displacement of at least one of said suns; and a second torque-dependent axial displacement device controlling a contact pressure between said annuluses and associated ones of said contact surfaces of said planets by using a torque-dependent axial displacement of at least one of said annuluses.

16. The speed-changing and differential gearing according to claim 15, wherein:
said load stage has a planet carrier shaft serving as an output shaft for said load stage, said differential stage has a planet carrier shaft serving as an input shaft for said differential stage; and
said load stage and said differential stage have planets and continuous bearing journals common to said load stage and to said differential stage, said planets of said load stage and said planets of said differential stage are supported jointly on said continuous bearing journals.

17. In combination with an electrically driven motor vehicle having driven wheels and an electric machine with an output shaft, a speed-changing and differential gearing comprising:
a housing;
a gearing input shaft;
two gearing output shafts disposed coaxially with said gearing input shaft;
an input stage configured as a friction roper planetary gearing, said input stage having a sun shaft acting as an input stage input shaft and being coaxially connectable, as said gearing input shaft, to the output shaft of the electric machine, said input stage having a planet carrier and a planet carrier shaft acting as an input stage output shaft, said sun shaft of said input stage having a first and a second sun disposed thereon, said first and said second sun being configured as respective friction rollers and being axially displaceable with respect to one another, at least one of said first and said second sun being connected for conjoint rotation to said sun shaft;
said input stage having a first annulus connected to said housing in a manner fixed against rotation relative thereto, said first annulus being configured as a friction ring;
said input stage having a plurality of stepped planets rotatably supported on said planet carrier, said stepped planets being configured as friction rollers, said stepped planets defining a first planet step of a relatively larger diameter and a second planet step of a relatively smaller diameter such that one of said suns rolls on the first planet step and said first annulus fixed in relation to said housing rolls on the second planet step, said stepped planets each having a pair of contact surfaces of a relatively smaller diameter and a pair of contact surfaces of a relatively larger diameter, said stepped planets each rolling on said suns by using an associated one of said pairs of contact surfaces and rolling on said first annulus by using at least one of said contact surfaces of a respective other one of said pairs of said contact surfaces;
said input stage having a second annulus configured as a friction ring, said second annulus being disposed to be axially displaceable relative to said first annulus such that said planets roll on said first and on said second annulus by using a respective associated one of said pairs of contact surfaces of said planets;
said input stage having a first torque-dependent axial displacement device controlling a contact pressure between said suns and associated ones of said contact surfaces of said planets by using a torque-dependent axial displacement of at least one of said suns;
said input stage having a second torque-dependent axial displacement device controlling a contact pressure between said annuluses and associated ones of said contact surfaces of said planets by using a torque-dependent axial displacement of at least one of said annuluses;
a load stage configured as a planetary set, said load stage having a sun shaft coaxially connected, as a load stage input shaft, to said input stage output shaft, said load stage having an annulus fixed in relation to said housing, said load stage having a planet carrier shaft acting as a load stage output shaft; and
a differential stage configured as a double planetary set, said differential stage having a differential stage input shaft and two differential stage output shafts, said differential stage output shafts being connectable, as said gearing output shafts, to the driven wheels of the motor vehicle, said differential stage having a planet carrier shaft acting as said differential stage input shaft, said differential stage having sun shafts acting as said differential stage output shafts.

* * * * *